Patented Mar. 17, 1936

2,034,054

UNITED STATES PATENT OFFICE 2,034,054

WATERINSOLUBLE AZODYESTUFFS

Heinrich Morschel, Cologne-Deutz, Germany, assignor to General Aniline Works, Inc., New York, N. Y., a corporation of Delaware No Drawing. Application November 21, 1934, Serial No. 754,182. In Germany December 8, 1933

8 Claims. (Cl. 260—95)

The present invention relates to waterinsoluble azodyestuffs and to cellulosic fibres dyed therewith, more particularly it relates to dyestuffs which may be represented by the general formula:

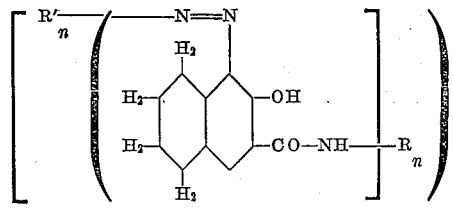

wherein R stands for an aromatic radical free from solubilizing groups, R' stands for the radical of a diazotization component free from solubilizing groups, one $n$ stands for the number one and the other $n$ stands for one of the numbers one and two.

My new dystuffs are obtainable by diazotizing or tetrazotizing respectively a diazotization component free from solubilizing groups and coupling in substance or on a substratum with a 5,6,7,8-tetrahydro-2-hydroxynaphthalene-carboxylic acid arylamide. The dyestuffs prepared in substance generally are dark brown, waterinsoluble products suitable as pigments, while those prepared on cellulosic fibres according to the usual methods of preparing ice colors generally yield brown to bordeaux to black shades of good fastness properties.

The 5,6,7,8-tetrahydro-2-hydroxynaphthalene-3-carboxylic acid arylamides used as coupling components in my invention have been described in my co-pending application for Letters Patent Serial No. 754,181, filed November 21, 1934, entitled: "Dyestuff intermediates".

The invention is illustrated by the following examples, without being limited thereto:

Example 1.—Well boiled and dried cotton yarn is impregnated in one litre of a solution containing 2,5 grams of 3,3'-dimethoxy-4,4'-di(5'',6'',7'', 8''-tetrahydro-2''-hydroxynaphthalene-3''-carbonyl)-aminodiphenyl, 10 ccs. of aqueous caustic soda lye of 34° Bé. and 10 ccs. of Turkey red oil of 50% strength, well squeezed and, without drying, introduced for about 20 minutes into one litre of a developing bath prepared in the usual manner by diazotizing 2 grams of 3-nitro-1-aminobenzene and neutralizing the excess mineral acid with sodium acetate, rinsed, soaped, again rinsed and dried. Thus is obtained a beautiful brown of good fastness properties. The dyestuff corresponds to the following formula:

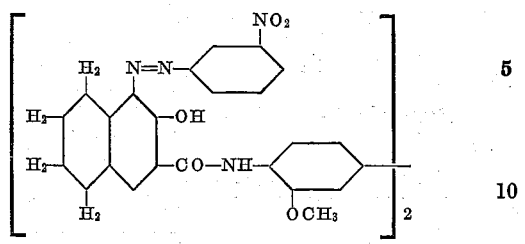

In an analogous manner the same coupling component yields with diazotized:

5-nitro-2-amino-1-methoxybenzene, a dark brown.
5-chloro-2-amino-1-methylbenzene, a brown.
4-chloro-2-aminodiphenylether, a powerful reddish-brown.

Example 2.—20 grams of 1-(5',6',7',8'-tetrahydro-2'-hydroxynaphthalene-3'-carbonylamino)-naphthalene are pasted with 20 ccs. of Turkey red oil of 50% strength and 20 ccs. of aqueous caustic soda lye of 38° Bé., dissolved by adding hot water and made up with water to one litre. In this solution cotton tissue is impregnated, squeezed and dried.

A

Part of the cotton thus impregnated is introduced for about 20 minutes into a diazo solution containing in one litre 11 grams of diazotized 5-nitro-2-amino-1-methylbenzene, 9 ccs. of glacial acetic acid and 20 grams of sodium acetate. The cotton is rinsed, soaped in a boiling bath, again rinsed and dried. A violet blackish-brown is thus obtained. The dyestuff corresponds to the following formula:

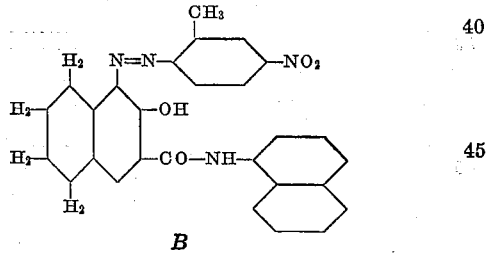

B

Part of the cotton tissue impregnated in accordance with paragraph 1 of this example is printed with a printing color prepared in the following manner:

15 grams of 5-nitro-2-amino-1-methoxybenzene are pasted with 25 ccs. of warm water and 7 grams of sodium nitrite. The paste thus obtained is slowly stirred into a mixture from 250 ccs. of cold water and 26 ccs. of hydrochloric acid of 32% strength. After standing for ½ hour, a solution of 15 grams of sodium acetate in 30 ccs. of water is added, then 10 ccs. of acetic acid of 50% strength are added, and the solution thus obtained is stirred into 500 grams of starch tragacanth thickener and made up with water to 1 kg.

The print is dried, boiled in one litre of a bath containing 2 ccs. of aqueous caustic soda lye of 38° Bé. and 2 ccs. of water glass, rinsed, soaped in a boiling bath, again rinsed and dried. A brownish-black is thus obtained. The dyestuff corresponds to the following formula:

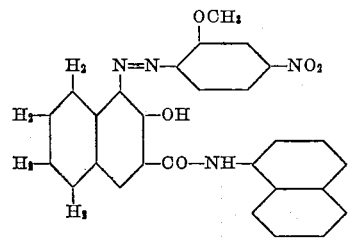

*Example 3.*—Cotton tissue is printed with a printing color prepared in the following manner:

6.5 grams of the diazoamino compound prepared from diazotized 2-chloro-4-benzoylamino-5-methoxy-1-aminobenzene and 4-sulfo-2-methylaminobenzoic acid and 3.1 grams of 2-(5′,6′,7′,8′-tetrahydro-2′-hydroxynaphthalene-3′-carbonylamino)-1-ethoxybenzene are pasted with a mixture from 3 ccs. of spirit, 3 ccs. of aqueous caustic soda lye of 38° Bé. and 15 ccs. of water, the paste is slightly heated and stirred into 50 grams of a neutral starch tragacanth thickener and made up with water to 100 grams.

The print is dried, steamed for 5 minutes with steam containing acetic and formic acid, rinsed, soaped in a boiling bath, again rinsed and dried. Thus is obtained a powerful yellowish-brown. The dyestuff corresponds to the following formula:

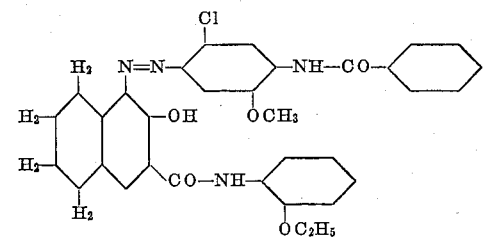

In the following table there are given some combinations prepared in accordance with the present invention and the shades obtained therewith on cotton:

| Coupling component | Diazotization component | Shade |
|---|---|---|
| 1-(5′,6′,7′,8′-tetrahydro-2′-hydroxynaphthalene-3′-carbonylamino)-2-methoxybenzene | 2-chloro-benzoylamino-5-methoxy-1-aminobenzene | Yellowish-brown |
| Do | 5-nitro-2-amino-1-methoxybenzene | Blackish-green |
| Do | 4-amino-3,2′-dimethylazobenzene | Blackish-brown |
| -4-methoxybenzene | 2-chloro-4-benzoylamino-5-methoxy-1-aminobenzene | Yellowish-brown |
| Do | 4-amino-3,2′-dimethylazobenzene | Blackish-brown |
| -2-ethoxybenzene | 4-nitro-1-naphthylamine | Yellowish dark brown |
| Do | 5-nitro-2-amino-1,4-dimethoxybenzene | Reddish-brown |
| -2-methyl-4-methoxybenzene | 4-amino-2,4′-dimethyl-5-methoxy-2′-nitroazobenzene | Blackish-brown |
| Do | 4-amino-2,3′-dimethylazobenzene | Dark brown |
| -2-methylbenzene | 2-nitro-4-methoxy-5-amino-1-methylbenzene | Reddish blackish brown |
| Do | 4-nitro-1-naphthylamine | Brownish-black |
| -2,5-dimethoxybenzene | 5-nitro-2-amino-1-methoxybenzene | Reddish blackish-brown |
| -5-chloro-2-methyl-benzene | do | Greenish-black |
| Do | 2-nitro-4-methoxy-5-amino-1-methylbenzene | Blackish-grey |
| -2,5-dimethylbenzene | 5-nitro-2-amino-1-methoxybenzene | Greenish-black |
| Do | 5-nitro-2-amino-1,4-dimethoxybenzene | Violet black |
| 4-(5′,6′,7′,8′-tetrahydro-2′-hydroxynaphthalene-3′-carbonylamino)-diphenyl | 4-chloro-2-aminodiphenylether | Reddish-brown |
| 1-(5′,6′,7′,8′-tetrahydro-2′-hydroxynaphthalene-3′-carbonylamino)-naphthalene | do | Reddish-brown |
| Do | 1-methoxy-2-aminobenzene-4-sulfodiethylamide | Deep bordeaux |
| Do | 1-aminoanthraquinone | Violet dark brown |
| 2-(5′,6′,7′,8′-tetrahydro-2′-hydroxynaphthalene-3′-carbonylamino)-naphthalene | 5-chloro-2-amino-1-methylbenzene | Reddish brown |
| Do | 4-amino-4′-methoxydiphenylamine | Do. |
| Do | 2-amino-5-benzoylamino-1,4-diethoxybenzene | Blackish-violet |
| Do | 1-aminoanthraquinone | Violet brown |
| 1,5-di-(5′,6′,7′,8′-tetrahydro-2′-hydroxynaphthalene-3′-carbonylamino)-naphthalene | 3-nitraniline | Brown |
| Do | 3-nitro-4-amino-1-methoxybenzene | Reddish-brown |
| 4,4′-di-(5″,6″,7″,8″-tetrahydro-2″-hydroxynaphthalene-3″-carbonylamino)-3,3′-dimethoxydiphenyl | 1-aminocarbazole | Brown |
| Do | 2-(4′-aminophenyl)-5-methylbenzothiazole | Dark brown |
| Do | 2-chloro-4-benzoylamino-5-methoxy-1-aminobenzene | Yellowish-brown |
| -3,3′-dimethyldiphenyl | 2-aminodiphenylsulfone | Reddish-brown |
| Do | 3-methoxy-4-aminodiphenylamine | Yellowish-brown |
| -diphenyl | 4,4′-dichloro-2-amino-diphenylether | Orange brown |
| Do | 4,5-dichloro-2-aminodiphenylether | Reddish-brown |
| 2-(5′,6′,7′,8′-tetrahydro-2′-hydroxynaphthalene-3′-carbonylamino-)diphenyleneoxide | 2-chloro-4-benzoylamino-5-methoxy-1-aminobenzene | Yellowish-brown |

I claim:
1. Waterinsoluble azodyestuffs of the general formula:

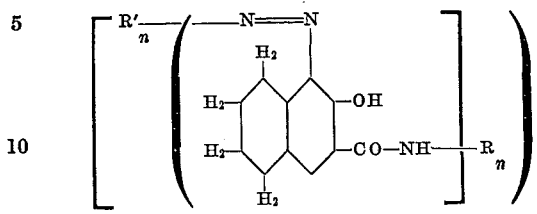

wherein R stands for an aromatic radical free from solubilizing groups, R' stands for the radical of a diazotization component free from solubilizing groups, one $n$ stands for the number one and the other $n$ stands for one of the numbers one and two, yielding, when produced on the fibre, generally brown to bordeaux to black shades of good fastness properties.

2. Waterinsoluble azodyestuffs of the general formula:

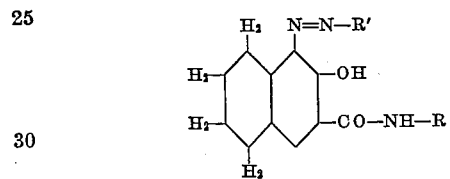

wherein R stands for a radical of the benzene or naphthalene series free from solubilizing groups and R' stands for a radical of the benzene series free from solubilizing groups, yielding, when produced on the fibre, generally brown to black shades of good fastness properties.

3. Waterinsoluble azodyestuffs of the general formula:

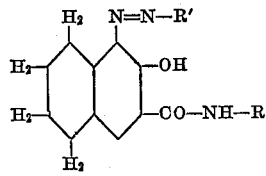

wherein R stands for a radical of the benzene or naphthalene series free from solubilizing groups and R' stands for a radical of the benzene series free from solubilizing groups containing a nitro group in p-position to the azo bridge, yielding, when produced on the fibre, generally brown to black shades of good fastness properties.

4. The dyestuff of the following formula:

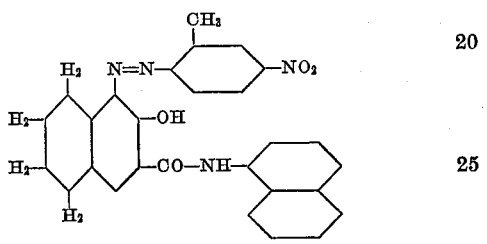

yielding, when produced on the fibre, violet blackish-brown shades of good fastness properties.

5. Fibres dyed with a dyestuff as claimed in claim 1.
6. Fibres dyed with a dyestuff as claimed in claim 2.
7. Fibres dyed with a dyestuff as claimed in claim 3.
8. Fibres dyed with the dyestuff as claimed in claim 4.

HEINRICH MORSCHEL.